(12) United States Patent
Shoemaker et al.

(10) Patent No.: US 12,427,987 B2
(45) Date of Patent: Sep. 30, 2025

(54) COST MAP FUSION FOR LANE SELECTION

(71) Applicant: TORC Robotics, Inc., Blacksburg, VA (US)

(72) Inventors: Adam Shoemaker, Christiansburg, VA (US); John Blankenhorn, Christiansburg, VA (US); Garrett Madsen, Austin, TX (US); Joshua Petrin, Christiansburg, VA (US); Ajay Tulsyan, Austin, TX (US); Paul Brown, Roanoke, VA (US); Savio Pereira, Austin, TX (US); William Davis, Austin, TX (US); Daniel Fernández, Roanoke, VA (US); Yexuan Hao, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 130 days.

(21) Appl. No.: 18/235,792

(22) Filed: Aug. 18, 2023

(65) Prior Publication Data
US 2025/0058780 A1 Feb. 20, 2025

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2300/145* (2013.01); *B60W 2552/53* (2020.02); *B60W 2556/35* (2020.02); *B60W 2556/40* (2020.02)

(58) Field of Classification Search
CPC ....... B60W 30/18163; B60W 2552/53; B60W 60/001
See application file for complete search history.

(56) References Cited

U.S. PATENT DOCUMENTS

| | | | |
|---|---|---|---|
| 8,781,669 B1* | 7/2014 | Teller | G05D 1/021 701/25 |
| 9,176,500 B1* | 11/2015 | Teller | B60W 30/08 |
| 10,074,279 B1* | 9/2018 | Xu | B60W 40/12 |
| 11,360,475 B2 | 6/2022 | Abrams et al. | |
| 2015/0353085 A1 | 12/2015 | Lee | |
| 2018/0261093 A1* | 9/2018 | Xu | G05D 1/0278 |
| 2019/0113927 A1* | 4/2019 | England | G06F 16/285 |
| 2020/0182633 A1* | 6/2020 | Liu | B60W 60/001 |
| 2020/0290619 A1* | 9/2020 | Mehdi | B60W 40/04 |

(Continued)

FOREIGN PATENT DOCUMENTS

| | | |
|---|---|---|
| CN | 107339997 A | 11/2017 |
| CN | 110356401 A | 10/2019 |
| CN | 111260956 A | 6/2020 |

(Continued)

*Primary Examiner* — Long T Tran
(74) *Attorney, Agent, or Firm* — Armstrong Teasdale LLP

(57) ABSTRACT

Systems and methods of generating lane selection cost maps to control autonomous vehicles are disclosed. An autonomous vehicle system can receive a plurality of cost values from a plurality of components of an autonomous vehicle; generate a lane selection cost map based on the plurality of cost values; determining that the autonomous vehicle should change lanes based on the lane selection cost map; and transmit a command that causes the autonomous vehicle to change lanes responsive to determining that the autonomous vehicle should change lanes.

13 Claims, 9 Drawing Sheets

(56) References Cited

U.S. PATENT DOCUMENTS

2022/0381563 A1* 12/2022 Liu ................ B60W 30/18163

FOREIGN PATENT DOCUMENTS

| | | |
|---|---|---|
| CN | 111923910 B | 1/2021 |
| CN | 112455445 A | 3/2021 |
| CN | 112882474 A | 6/2021 |
| CN | 111081046 B | 1/2022 |
| CN | 114625823 A | 6/2022 |
| CN | 115140093 A | 10/2022 |
| CN | 115973187 A | 4/2023 |
| CN | 116252796 A | 6/2023 |
| CN | 115630232 B | 8/2023 |

* cited by examiner

//COST MAP FUSION FOR LANE SELECTION

TECHNICAL FIELD

The present disclosure relates generally to autonomous vehicles and, more specifically, to generating cost maps for lane selection during autonomous vehicle operation.

BACKGROUND

The use of autonomous vehicles has become increasingly prevalent in recent years, with the potential for numerous benefits. One challenge faced by autonomous vehicles is optimizing lane selection when driving on multi-lane roadways. The decision to stay in or change lanes is determined based on information from multiple different sources. An autonomous vehicle may require a lane change for a number of different reasons. Conditions where an autonomous vehicle should change lanes can include critical cases, such as moving into an upcoming exit lane or moving out of a lane that is ending, as well as less-critical cases, such as when there is a vehicle or obstacle on the shoulder, or a number of ramps are coming up with merging vehicles.

However, the variety of conditions that may require a lane change requires autonomous vehicles to implement complex and inefficient software, which may not properly handle conflicts between multiple critical lane change conditions. These problems are compounded by the fact that such occurrences can happen arbitrarily and unpredictably during autonomous vehicle operation.

SUMMARY

The systems and methods of the present disclosure may solve the problems set forth above and/or other problems in the art. The scope of the current disclosure, however, is defined by the attached claims, and not by the ability to solve any specific problem. Disclosed herein are techniques to improve lane selection during autonomous vehicle operation through the use of cost maps. Rather than utilizing separate components that each request a lane change, irrespective of other components, the systems and methods described herein implement a cost map-based approach that combines cost values to create lane selection cost maps.

The generation of lane selection cost maps can include generating costs for being in a lane from different behaviors (e.g., autonomous vehicle software components) and combining those costs into a lane selection cost map. The lane selection cost map can be generated based on cost values generated by one or more components (e.g., software, hardware, or combination software-hardware components, etc.) of the autonomous vehicle. Some example cost values provided by said components include predetermined costs corresponding to static map features and roadway courtesy cost values for shoulder vehicles and merging vehicles. In an embodiment, the cost map may be created using cost values generated by components that track traffic or other roadway objects, including costs generated based on the speed difference between the autonomous vehicle and proximate traffic as well as the inconvenience to the traffic for being in a particular lane.

The lane selection cost map can include nodes that represent positions within each lane. To determine whether to switch between lanes, the autonomous vehicle system can perform a search for the optimal path in the cost map. The autonomous vehicle system can dynamically update the path to change lanes as the autonomous vehicle operates. The path can be utilized to determine which lane to be in to reach a predetermined destination while avoiding locations or obstacles that may pose a risk to the autonomous vehicle or may prevent the autonomous vehicle from timely reaching the predetermined destination.

One embodiment of the present disclosure is directed to a system. The system includes at least one processor coupled to non-transitory memory. The system can receive a plurality of cost values from a plurality of components of an autonomous vehicle, each cost value representing a cost for traveling in a particular region of a particular lane; generate a lane selection cost map based on the plurality of cost values; responsive to a trajectory of the autonomous vehicle in an adjacent lane having a lower cost value than a trajectory of the autonomous vehicle in a current lane, determine that the autonomous vehicle should change lanes based on the lane selection cost map; and transmit a command that causes the autonomous vehicle to change lanes responsive to determining that the autonomous vehicle should change lanes.

The system may generate the lane selection cost map by combining at least two cost values of the plurality of cost values that corresponding to a common region of the lane selection cost map. Combining at least two cost values may include summing at least two cost values corresponding to the common region of the lane selection cost map. The system may calculate a weighted sum based on the at least two cost values. The system may determine that the autonomous vehicle should change lanes based on execution of a pathfinding algorithm using the lane selection cost map.

The system may generate the lane selection cost map in response to a detected object in an environment surrounding the autonomous vehicle. At least one of the plurality of cost values may be determined based on a location of the autonomous vehicle. At least one of the plurality of cost values may be determined based on map data comprising one or more static map features. At least one of the plurality of cost values may be determined based on a detected obstacle.

At least one other aspect of the present disclosure is directed to a method. The method may be performed, for example, by one or more processors coupled to non-transitory memory. The method includes receiving a plurality of cost values from a plurality of components of an autonomous vehicle, each cost value representing a cost for traveling in a particular region of a particular lane; generating a lane selection cost map based on the plurality of cost values; responsive to a trajectory of the autonomous vehicle in an adjacent lane having a lower cost value than a trajectory of the autonomous vehicle in a current lane, determining, by the one or more processors, that the autonomous vehicle should change lanes based on the lane selection cost map; and transmitting a command that causes the autonomous vehicle to change lanes responsive to determining that the autonomous vehicle should change lanes.

Generating the lane selection cost map may comprise combining at least two cost values of the plurality of cost values that correspond to a common region of the lane selection cost map. Combining the at least two cost values may comprise summing the at least two cost values corresponding to the common region of the lane selection cost map. The method may include calculating a weighted sum based on the at least two cost values. The method may include determining that the autonomous vehicle should change lanes based on execution of a pathfinding algorithm using the lane selection cost map.

The method may include generating the lane selection cost map in response to a detected object in an environment surrounding the autonomous vehicle. At least one of the plurality of cost values may be determined based on a location of the autonomous vehicle. At least one of the plurality of cost values may be determined based on map data comprising one or more static map features. At least one of the plurality of cost values may be determined based on a detected obstacle.

Yet another aspect of the present disclosure is directed to an autonomous vehicle comprising one or more processors. The autonomous vehicle can identify a plurality of cost values generated by a plurality of components of the autonomous vehicle, each cost value representing a cost for traveling in a particular region of a particular lane; generate a lane selection cost map based on the plurality of cost values; responsive to a trajectory of the autonomous vehicle in an adjacent lane having a lower cost value than a trajectory of the autonomous vehicle in a current lane, determine that the autonomous vehicle should change lanes based on the lane selection cost map; and cause the autonomous vehicle to change lanes responsive to determining that the autonomous vehicle should change lanes.

The autonomous vehicle may generate the lane selection cost map by combining at least two cost values of the plurality of cost values that correspond to a common region of the lane selection cost map.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
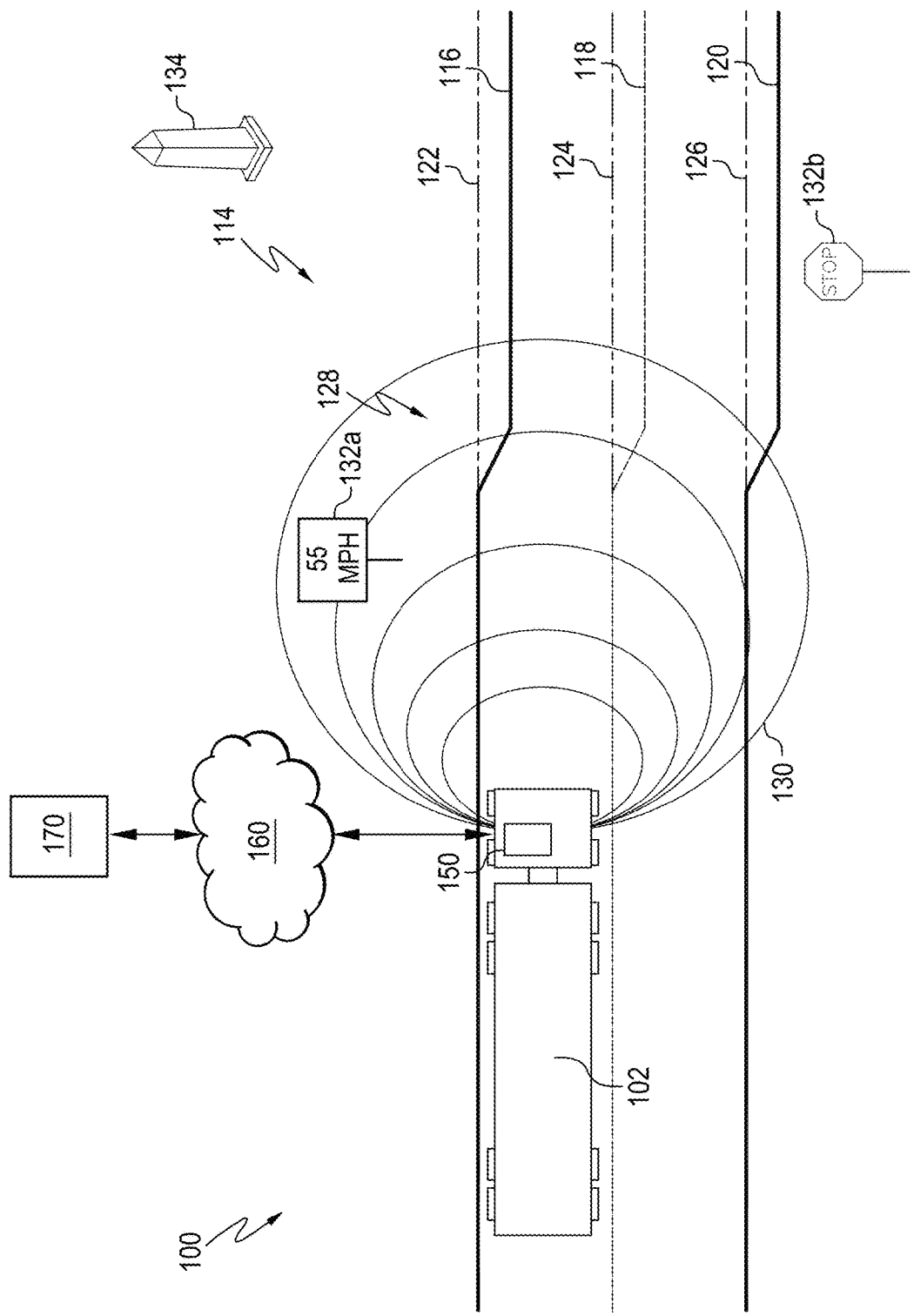
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality.

Figure 2:
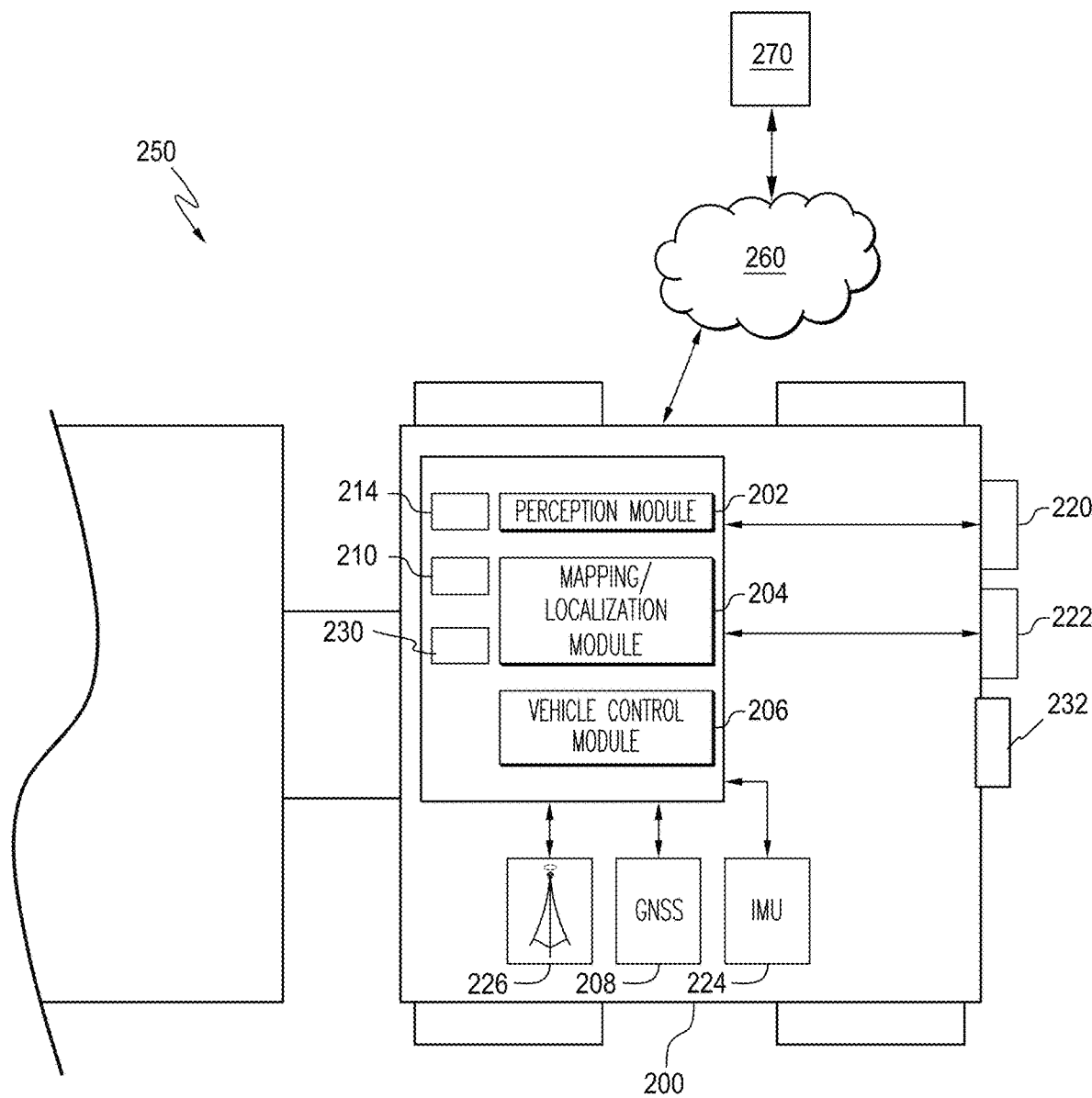
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck. Various other known circuits may be associated with the autonomy system 250, including signal-conditioning circuitry, communication circuitry, actuation circuitry, and other appropriate circuitry.

Figure 4:
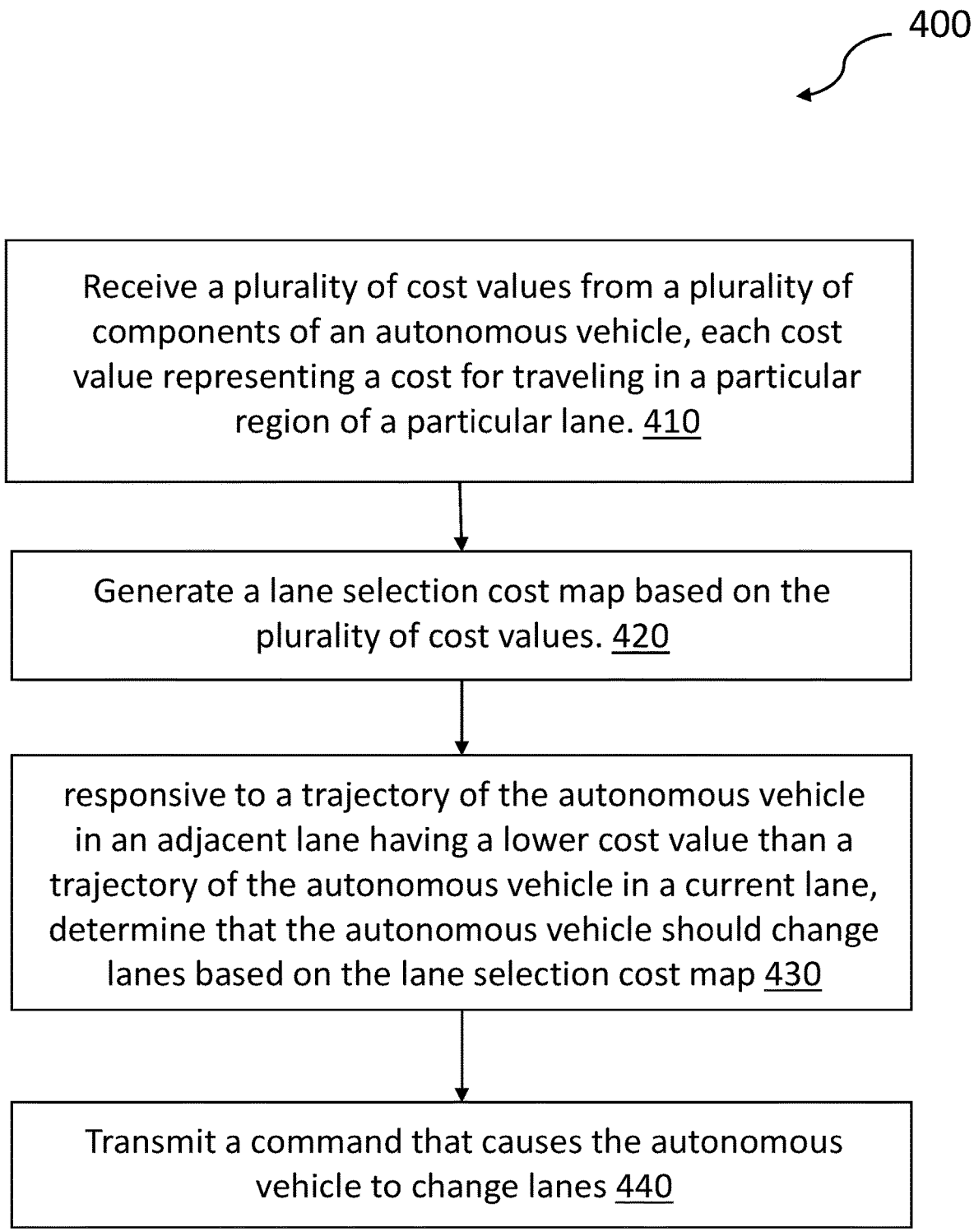
FIG. 4 is a flow diagram of an example method of generating lane selection cost maps for autonomous vehicle control, according to an embodiment.

The memory 214 of autonomy system 250 may store data and/or software routines that may assist the autonomy system 250 in performing its functions, such as the functions of the perception module 202, the localization module 204, the vehicle control module 206, a road analysis module 230, and the method 400 of FIG. 4. The memory 214 may store one or more cost values or cost maps generated by various components of the autonomous vehicle (e.g., the perception module 202, the mapping/localization module 204, the vehicle control module 206, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates presence of the lane lines 116, 118, 120. Features perceived by the vehicle should generally track with one or more features stored in a digital map (e.g., in the localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario, the vehicle approaches a new bend 128 in the road that is not stored in any of the digital maps on board the truck 102 because the lane lines 116, 118, 120 have shifted right from their original positions 122, 124, 126.

The system 150 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connecting to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it on board and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital features representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems; for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.). The vehicle control module 206 may be configured to avoid obstacles in the environment surrounding the truck and use one or more system inputs to identify, evaluate, and modify a vehicle trajectory. The vehicle control module 206 is depicted as a single module, but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion.

In disclosed embodiments of a system for planning paths that will minimize the severity of a collision, the system 150, 250 collects perception data on objects that satisfy predetermined criteria for likelihood of collision with the ego vehicle. Such objects are sometimes referred to herein as target objects. Collected perception data on target objects may be used in collision analysis.

In an embodiment, road analysis module 230 executes an artificial intelligence model to predict one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle and an effective mass attribute of the respective target object. In an embodiment, the artificial intelligence model is a predictive machine learning model that may be continuously trained using updated data, e.g., relative velocity data, mass attribute data, and target objects classification data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Figure 3:
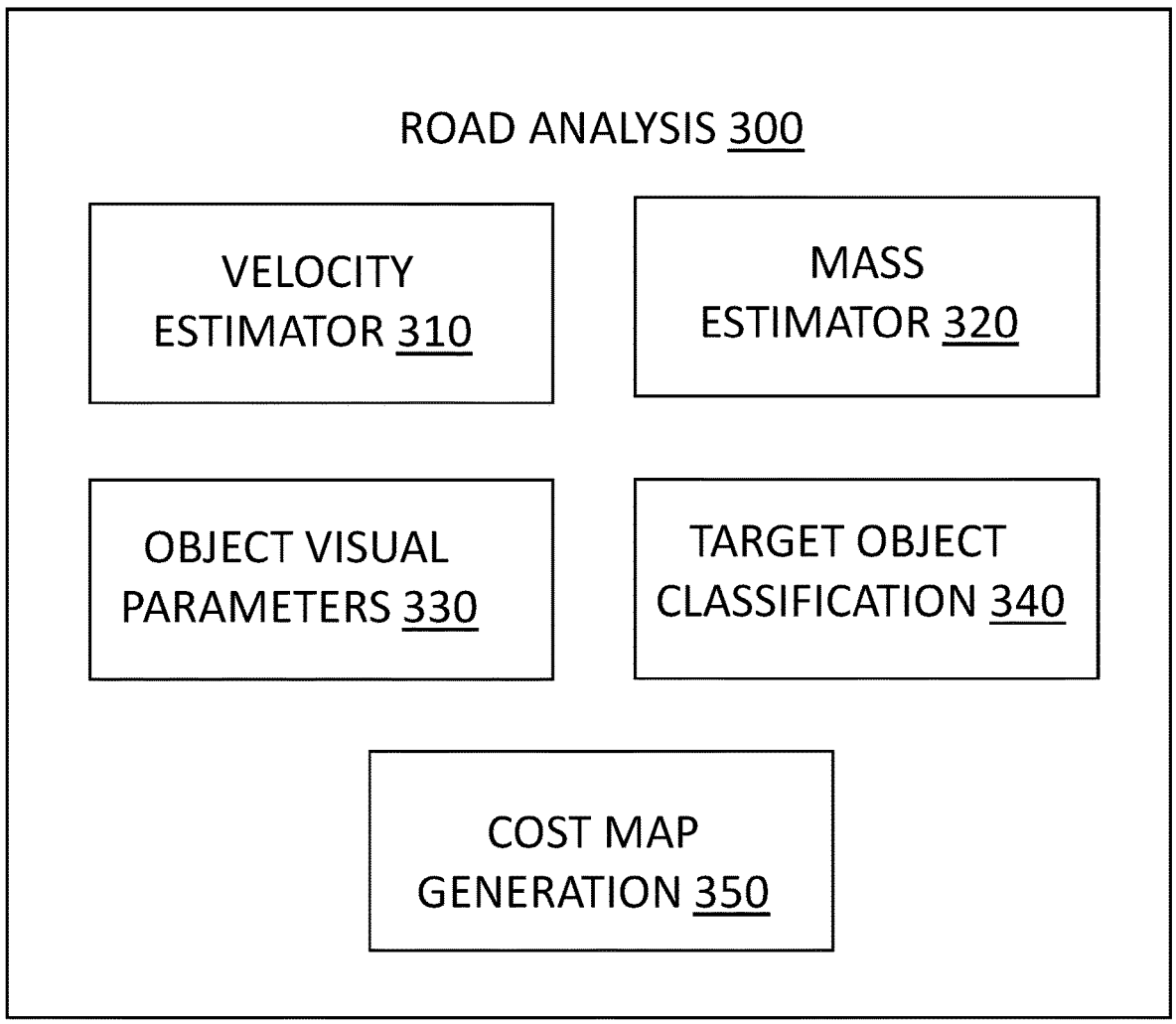
FIG. 3 is a schematic diagram of a road analysis module of the autonomy system of an autonomous vehicle, according to an embodiment.

FIG. 3 shows a road analysis module 300 of system 150, 250. The road condition analysis module 300 includes velocity estimator 310, effective mass estimator 320, object visual parameters component 330, target object classification component 340, and the cost map generation module 350. These components of road analysis module 300 may be either or both software-based components and hardware-based components.

Velocity estimator 310 may determine the relative velocity of target objects relative to the ego vehicle. Effective mass estimator 320 may estimate effective mass of target objects, for example, based on object visual parameters signals from object visual parameters component 330 and object classification signals from target object classification component 340. Object visual parameters component 330 may determine visual parameters of a target object such as size, shape, visual cues and other visual features in response to visual sensor signals and generate an object visual parameters signal. Target object classification component 340 may determine a classification of a target object using information contained within the object visual parameters signal, which may be correlated to various objects and generate an object classification signal. For instance, the target object classification component 340 can determine whether the target object is a plastic traffic cone or an animal.

Target objects may include moving objects, such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects, can be infrastructure objects as well as temporarily static objects such as parked cars. Systems and methods herein may aim to choose a collision path that may involve a nearby inanimate object. The systems and methods aim to avoid a vulnerable pedestrian, bicyclist, motorcycle, or other targets involving people or animate beings, and this avoidance is a priority over a collision with an inanimate object.

Externally-facing sensors may provide system 150, 250 with data defining distances between the ego vehicle and target objects in the vicinity of the ego vehicle and with data defining direction of target objects from the ego vehicle. Such distances can be defined as distances from sensors, or sensors can process the data to generate distances from the center of mass or other portion of the ego vehicle. The externally-facing sensors may provide system 150, 250 with data relating to lanes of a multi-lane roadway upon which the ego vehicle is operating. The lane information can include indications of target objects (e.g., other vehicles, obstacles, etc.) within lanes, lane characteristics of the roadway (e.g., number of lanes, whether lanes are narrowing or ending, whether the roadway is expanding into additional lanes, etc.), or information relating to objects adjacent to the lanes of the roadway (e.g., an object or vehicle on the shoulder, on on-ramps or off-ramps, etc.). Such information can be utilized by the various components of the system 150, 250 to generate cost values for traveling within one or more lanes.

In an embodiment, the system 150, 250 collects data relating to target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, one or more components of system 150, 250 may utilize map data to determine lane cost values. For example, in an embodiment, the mapping/localization module 204 receives perception data that can be compared to one or more digital maps stored in the mapping/localization module 204 to determine a location of the ego vehicle and to identify lanes that are proximate to the ego vehicle. In an embodiment, the map data stored by the mapping/localization module 204 can store lane cost information for each lane that is based on the features of the roadway. The cost values can be lane-specific for the roadway, and may indicate a relative cost of remaining in the lane corresponding to a respective cost value. In an embodiment, a greater cost value can indicate that it is "expensive," or undesirable, to remain in the lane, while a lesser cost value (or a zero cost value) can indicate that it is desirable to remain in the lane.

The cost values can be region-specific (e.g., map to a particular region of a lane). In some cases, certain regions of a lane may have a changing cost value along the length of the lane. For example, the cost value for a lane can increase (e.g., in lock-step increments, in a gradient, etc.) in regions of the lane that precede a taper or end of the lane. Likewise, regions of lanes that lead into an on-ramp (e.g., on a multi-lane roadway) have a greater cost value than middle lanes. The cost values, and the regions of lanes to which they correspond, can be stored as part of (or in association with) map data. For example, the mapping/localization module 204 can store map data with constant cost values that are generated based on any type of feature of the lanes that may impact safety of remaining in the lane, including the number of lanes, whether the lanes end or are tapering off, lane speed limit, whether lanes are turn-only lanes or lead to intersections, lights, or signs, or other lane features. In an embodiment, the cost values stored by the mapping/localization module 204 can be pre-generated and stored with the map data. The constant and map-specific cost values stored by the mapping/localization module 204 can be provided to the cost map generation module 350.

In an embodiment, the system 150, 250 can generate a high-definition (HD) map used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a 3D model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the autonomous vehicle. The system 150, 250 may use real-time updates from the vehicle's onboard sensors to continuously update the HD map as the vehicle moves. This enables the vehicle to maintain an up-to-date representation of its surroundings and respond to changing conditions in real time.

The ability to generate an HD map may allow for safe and efficient operation of autonomous vehicles, as the map provides a detailed, up-to-date representation of the road network that the vehicle can use to navigate and make real-time decisions. Using the methods and systems discussed herein, a processor of the autonomous vehicle may generate an HD map, revise the HD map using various data (e.g., from identified road signs or received from a server), and/or display the map for a human driver.

Additional components of the system 150, 250 can generate cost values for lanes detected by the autonomous vehicle. For example, in addition to the costs based on static map features by the mapping/localization module 204, additional components (e.g., software components, hardware components, combination software-hardware components, etc.) of the system 150, 250 may generate costs for lanes based on obstacles, anticipated driving behaviors, or detected traffic features. This data may be generated, for example, based on the perception data of the perception module 202. In an embodiment, different components of the system 150, 250 may be responsible for generating or controlling different behaviors of the ego vehicle. Said components (e.g., the perception module 202, the mapping/localization module 204, the vehicle control module 206, the road analysis module 300, the target object classification module 340, etc.) can generate one or more cost values corresponding to their respective behaviors.

The cost values may be generated during operation of the ego vehicle. For example, the cost values for a lane may be updated or generated upon detecting obstacles, other vehicles, or changes in road or lane features. In an embodiment, a cost value for a portion of a lane can be proportional to a level of risk (e.g., safety risk, risk to the ego vehicle, etc.) when the ego vehicle operates in the respective portion of the lane. In an embodiment, a cost value for a portion of a lane can be inversely proportional to whether traveling in the respective portion of the lane enables the ego vehicle to navigate to one or more destinations while operating safely and abiding by traffic laws and regulations. Generated or predetermined cost values for one or more regions of a roadway upon which the ego vehicle is driving can be provided to the cost map generation component 350 to generate a lane selection cost map for the ego vehicle.

The cost map generation component 350 can generate a lane selection cost map for the ego vehicle using the cost values generated by the various components of the ego vehicle, as described herein. In an embodiment, each of the cost values can correspond to a respective region of a map (described in further detail in connection with FIGS. 5A-5C). The regions of lanes may be referred to herein as regions of interest, stretches of lanes, or stretches. To generate the lane selection cost map, the cost map generation component 350 can combine all of the cost values for each stretch of the roadway into a single map (e.g., as shown in FIG. 6). For regions in which stretches with cost values from different sources overlap, the cost map generation component 350 can combine the cost values into a single cost value for the stretch.

In an embodiment, to combine the cost values, the cost map generation component 350 can add each overlapping cost value together. The resulting lane selection cost map can therefore include cost values that are greater than any single cost value in stretches where multiple cost values overlap. In an embodiment, the cost map generation component 350 can utilize one or more weight values to calculate a weighted sum cost value for a stretch where cost values overlap. For example, the cost map generation component 350 may multiply the respective cost values that overlap in a region with a weight value to generate weighted cost values. The weighted cost values in the overlapping region can then be summed to calculate a weighted sum cost value, which may be utilized as the cost value for the stretch of roadway where the multiple cost values overlapped.

The cost map generation component 350 can utilize the cost value for a non-overlapping cost value as the cost for that stretch in the lane selection cost map. Regions without cost values contributed from one or more components of the ego vehicle may be set to a default value (e.g., zero, etc.). Once generated, the lane selection cost map can be utilized to execute a path-finding algorithm to determine whether to generate a command to change lanes. The goal of the pathfinding algorithm is to determine a path through the roadway that minimizes the total cost of the regions traversed by the ego vehicle, while taking into account various constraints imposed on lane changing. If the optimal path includes the ego vehicle moving to another lane, the cost map generation component 350 can generate a command that causes the ego vehicle to attempt to change lanes. The command may be provided to a service or component responsible for managing merges or lane changes that are to be made by the ego vehicle.

FIG. 4 is a flow diagram of an example method 400 of generating lane selection cost maps for autonomous vehicle control, according to an embodiment. The steps of the method 400 of FIG. 4 may be executed, for example, by an autonomous vehicle system, including the system 150, 250, or the road analysis module 300, according to some embodiments. The method 400 shown in FIG. 4 comprises execution steps 410-440. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 400 of FIG. 4 is described as being performed by an autonomous vehicle system (e.g., the system 150, the system 250, the road analysis module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 4 as having a particular order, it is intended that the steps may be performed in any order. It is also intended that some of these steps may be optional.

At step 410, the autonomous vehicle system (e.g., the system 150, 250, the road analysis module 300, etc.) of an autonomous vehicle (e.g., the truck 102, the truck 200, etc.) can receive cost values from one or more components (e.g., the perception module 202, the mapping/localization module 204, the vehicle control module 206, the processor 210, etc.) of the autonomous vehicle. The components of the autonomous vehicle may include software components, hardware components, or combination software-hardware components, among others. The components of the autonomous vehicle may execute to generate information relating to autonomous or semi-autonomous operation of the autonomous vehicle using sensor data captured by sensors of the autonomous vehicle. The generated information may include perception data, as described herein, which may also be utilized by said components to generate cost values for one or more autonomous vehicle behaviors.

In an embodiment, one or more components of the autonomous vehicle system may utilize map data to determine lane cost values. For example, in an embodiment, the components of the autonomous vehicle system can receive perception data that can be compared to one or more digital maps stored in memory to determine a location of the autonomous vehicle and to identify lanes that are proximate to the autonomous vehicle. In an embodiment, the map data include lane cost information for regions of each lane, which are determined based on the features of the roadway. The cost values can be lane-specific for the roadway, and may indicate a relative cost of remaining in the lane at each region. In an embodiment, a greater cost value can indicate that it is "expensive," or undesirable, to remain in the lane, while a lesser cost value (or a zero cost value) can indicate that it is desirable to remain in the lane.

Additional components of the autonomous vehicle system can generate costs for regions of lanes based on obstacles, anticipated driving behaviors, or detected traffic features. This data may be generated, for example, based on the perception data of the perception model. In an embodiment, different components of the autonomous vehicle system may be responsible for generating or controlling different behaviors of the autonomous vehicle. Said components (e.g., the perception module 202, the mapping/localization module 204, the vehicle control module 206, the road analysis module 300, the target object classification module 340, etc.) can generate one or more cost values corresponding to their respective behaviors. Example cost values corresponding to respective maps and behaviors are described in connection with FIGS. 5A, 5B, and 5C.

The cost values may each represent a cost for traveling in a particular region of a particular lane. The cost values may be generated during operation of the autonomous vehicle. For example, the cost values for a lane may be updated or generated upon detecting obstacles, other vehicles, or changes in road or lane features. In an embodiment, a cost value for a portion of a lane can be proportional to a level of risk (e.g., safety risk, risk to the autonomous vehicle, risk to schedule, etc.) when the autonomous vehicle operates in the respective portion of the lane. In an embodiment, a cost value for a portion of a lane can be inversely proportional to whether traveling in the respective portion of the lane enables the autonomous vehicle to navigate to one or more destinations while operating safely and abiding by traffic laws and regulations. Generated or predetermined cost values for one or more regions of a roadway upon which the autonomous vehicle can be received by or generated in part by the autonomous vehicle system, and utilized to create a lane selection cost map for navigating the autonomous vehicle on a roadway.

At step 420, the autonomous vehicle system can generate a lane selection cost map based on the cost values received or generated in step 410. The autonomous vehicle system can generate a lane selection cost map for the autonomous vehicle using the cost values generated by the various components of the autonomous vehicle, as described herein. In an embodiment, each of the cost values can correspond to a respective region of a map (described in further detail in connection with FIGS. 5A-5C). To generate the lane selection cost map, the autonomous vehicle system can combine all of the cost values for each stretch of the roadway into a combined cost map (e.g., as shown in FIG. 6), which is utilized as the lane selection cost map. For regions in which stretches with cost values from different sources overlap, the cost autonomous vehicle system can combine the cost values into a single cost value for the stretch.

To combine overlapping cost values in the cost map, the autonomous vehicle system can add each overlapping cost value together. The resulting lane selection cost map can therefore include cost values that are greater than any single cost value in stretches where multiple cost values overlap. In an embodiment, the autonomous vehicle system can multiply the sum by one or more weight values to augment or attenuate the combined cost value for a stretch where cost values overlap. For example, the autonomous vehicle system may multiply respective cost values that overlap in a region with a weight value to generate weighted cost values. The weighted cost values in the overlapping region can then be summed to calculate a weighted sum cost value, which may be utilized as the cost value for the stretch of roadway where the multiple cost values overlapped.

The autonomous vehicle system can utilize the cost value for a non-overlapping cost value as the cost for that stretch in the lane selection cost map. Regions without cost values contributed from one or more components of the autonomous vehicle may be set to a default value (e.g., zero, etc.). The autonomous vehicle system may generate the lane selection cost map dynamically, such that the lane selection cost map includes up-to-date information and cost values generated via the various components of the autonomous vehicle system. In an embodiment, the autonomous vehicle system may generate the lane selection cost map in real time or near real time, such that the autonomous vehicle can continuously utilize the lane selection cost map to determine an optimal path to travel to reach a predetermined destination. In another embodiment, the autonomous vehicle system may generate the lane selection cost map in response to one or more predetermined events (e.g., upon detecting multiple or additional lanes in the roadway, upon detecting obstacles, traffic, on-ramps, off-ramps, or changes to the number of lanes in the roadway, upon traveling a distance in a region represented by an existing lane selection cost map, upon traveling a predetermined distance, upon detecting a predetermined or periodic interval, etc.).

At step 430, responsive to a trajectory of the autonomous vehicle in an adjacent lane having a lower cost value than a trajectory of the autonomous vehicle in a current lane, the autonomous vehicle system can determine that the autonomous vehicle should change lanes based on the lane selection cost map generated in step 420. To do so, the autonomous vehicle system can execute a path-finding algorithm to determine whether to generate a command to change lanes. The pathfinding algorithm can be utilized to determine a path for the autonomous vehicle through the roadway that minimizes the total cost of the regions traversed by the autonomous vehicle, while taking into account various constraints imposed on lane changing.

To find the optimal path that the autonomous vehicle should travel on the roadway, the autonomous vehicle can iterate through the lane selection cost map to determine the cost associated with each possible action in each path, and select the path with the lowest total cost from a start point to a destination. The destination may be a predetermined location along the roadway (e.g., an off-ramp on a highway, etc.). The start point may be the current location of the autonomous vehicle. The autonomous vehicle system may execute the pathfinding algorithm, for example, in response to generation of or updates to the lane selection cost map. In an embodiment, the autonomous vehicle system can execute the pathfinding algorithm to The pathway can be defined in terms of a distance that the autonomous vehicle should travel in each lane before changing lanes on the roadway, for example.

At step 440, the autonomous vehicle can transmit a command that causes the autonomous vehicle to change lanes. If the path generated in step 430 includes the autonomous vehicle moving to another lane, the autonomous vehicle can generate a command that causes the autonomous vehicle to attempt to change lanes. The command may be provided to a service or component responsible for managing merges or lane changes that are to be made by the autonomous vehicle. For example, the service or component can control how the autonomous vehicle navigates the roadway upon which it is traveling and can control the autonomous vehicle to safely and efficiently change lanes in response to the commands generated or otherwise provided by the autonomous vehicle system. Said components can control various physical components of the autonomous vehicle to cause the autonomous vehicle to change lanes, including the powertrain, steering, accelerator, or brakes. In an embodiment, the autonomous vehicle system can detect, based on an updated or newly generated lane selection cost map, after transmitting the command and prior to the autonomous vehicle physically changing lanes, that a change in lanes is no longer the optimal path for the autonomous vehicle. In such embodiments, the autonomous vehicle can transmit a termination command to terminate the request to change lanes, prior to the autonomous vehicle physically changing lanes.

Figure 5A:
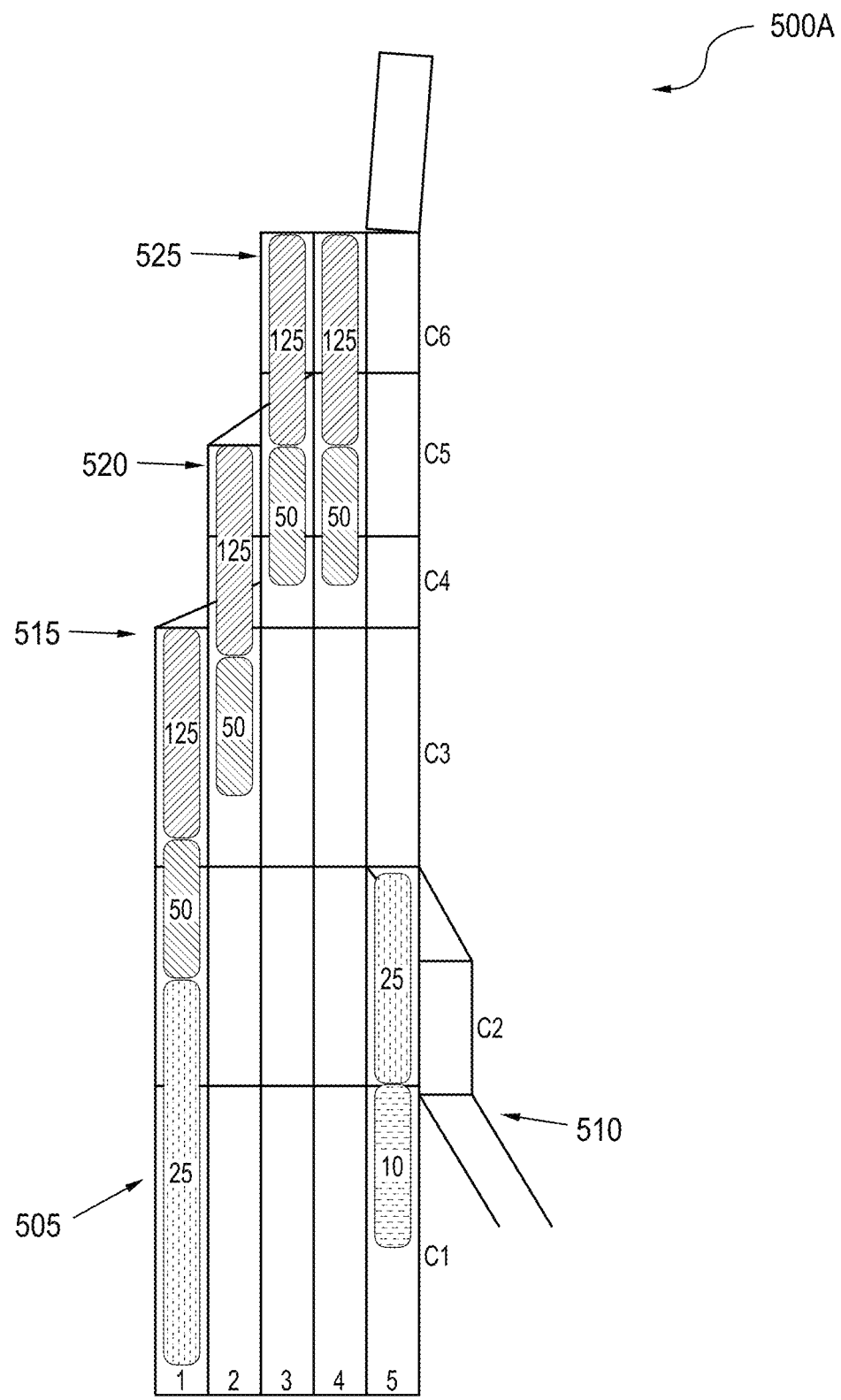
FIGS. 5A, 5B, and 5C depict diagrams of example cost values on a road map that are generated based on different components of an autonomous vehicle, according to an embodiment.
Figure 5B:
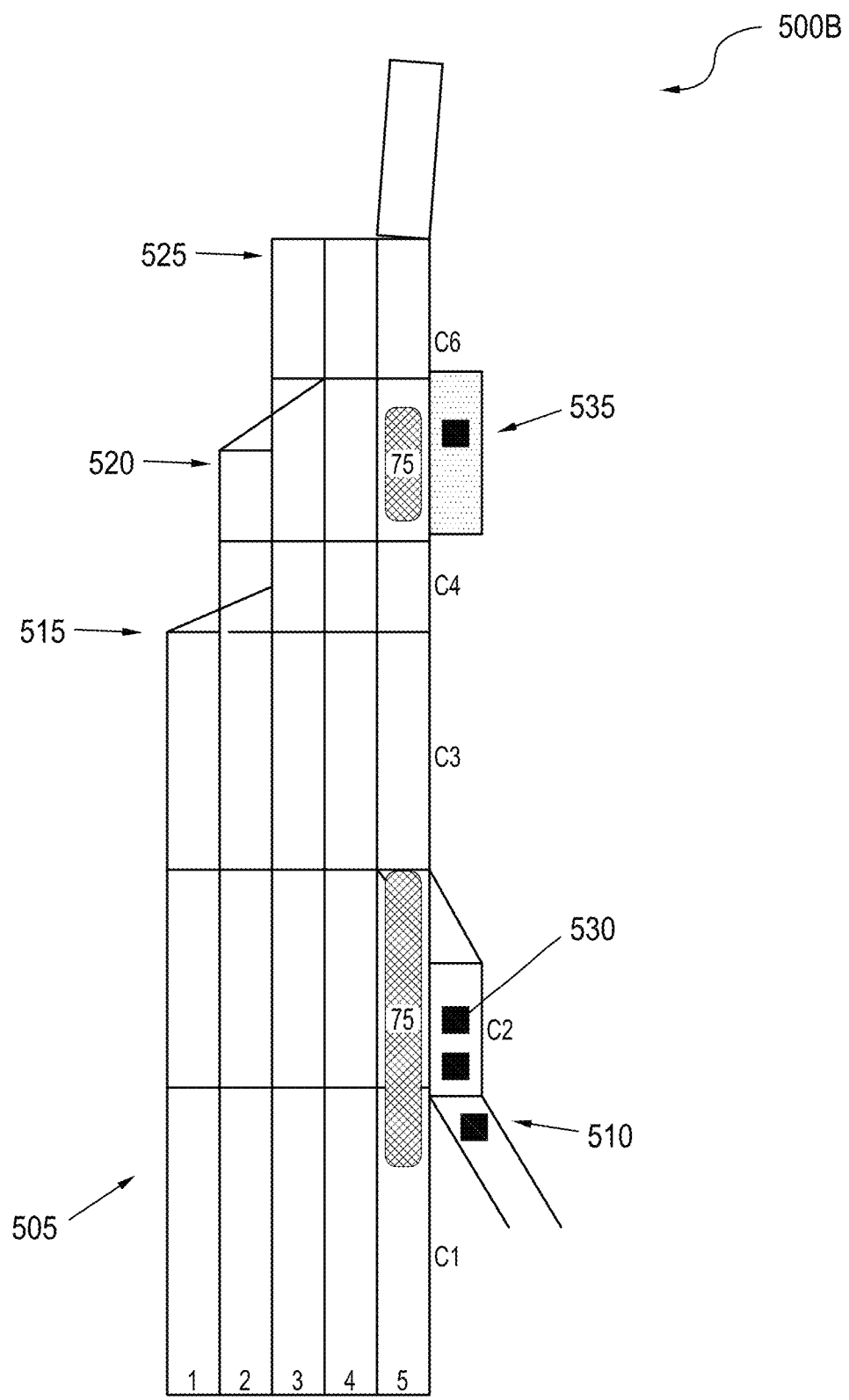
Figure 5C:
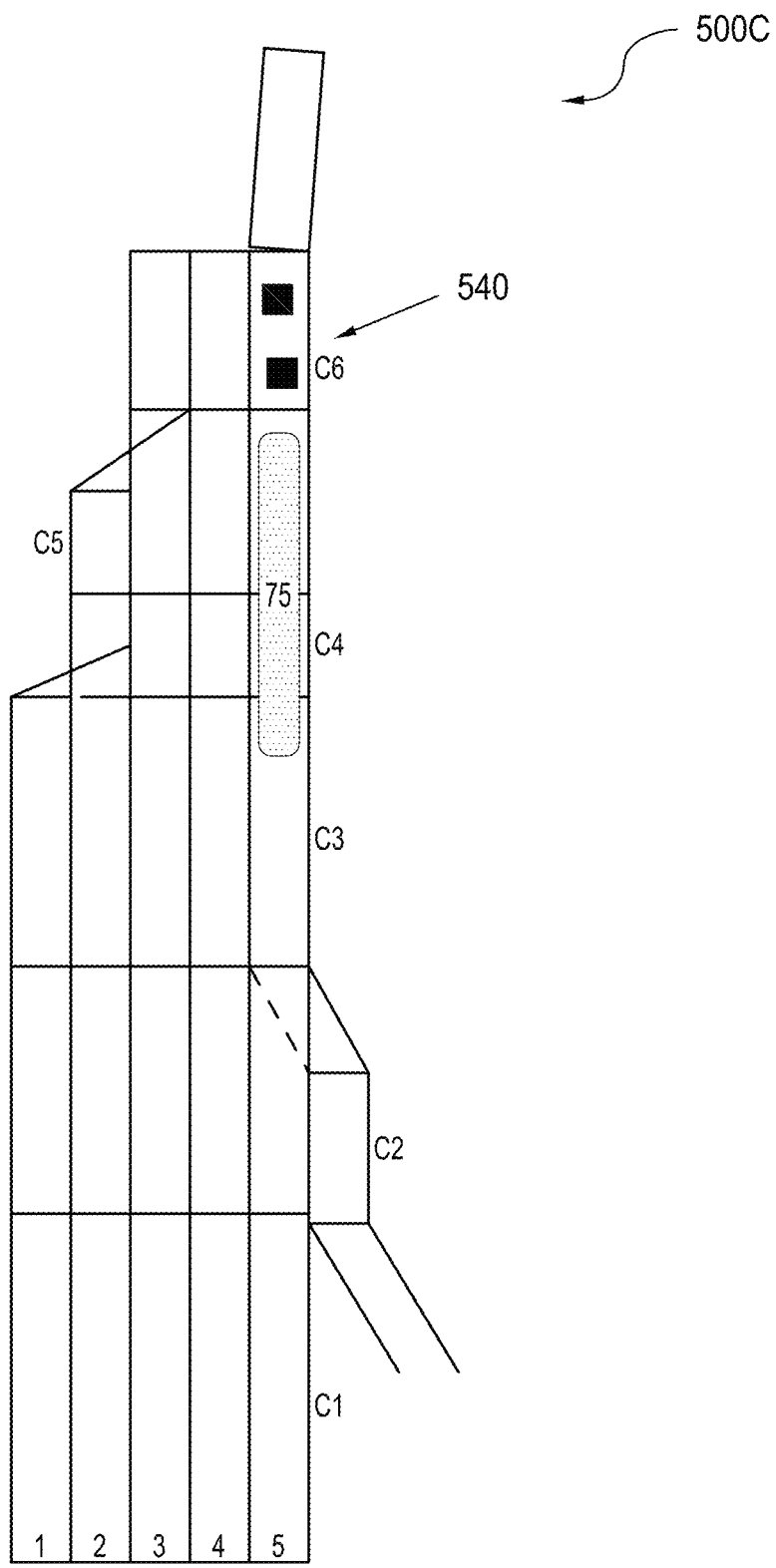
Figure 6:
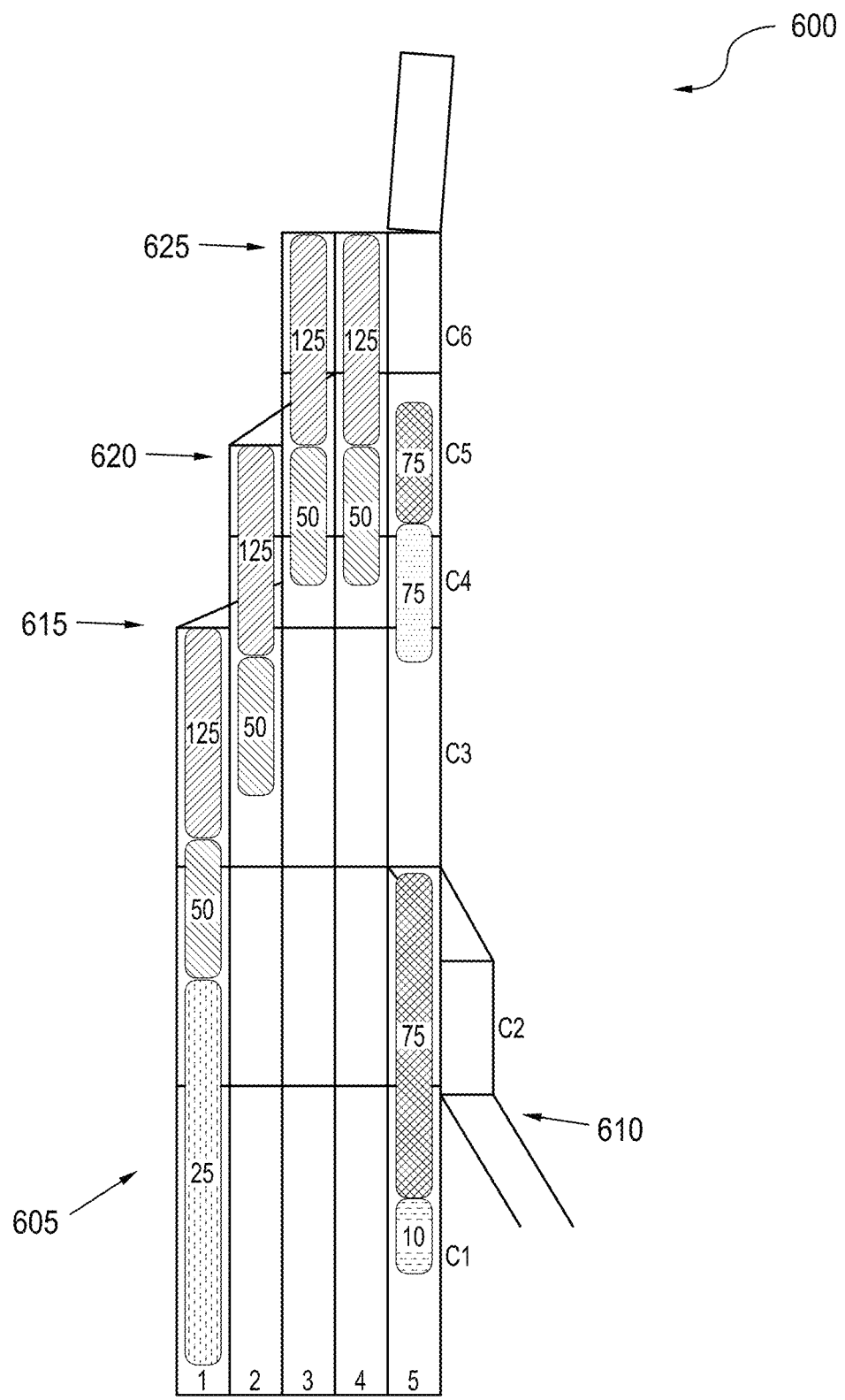
FIG. 6 depicts a diagram of an example lane selection cost map generated based on the cost values shown in FIGS. 5A, 5B, and 5C, according to an embodiment.

FIGS. 5A, 5B, and 5C depict diagrams of example cost values on a road map that are generated based on different components of an autonomous vehicle, according to an embodiment. Referring to FIG. 5A, illustrated is a diagram of cost values generated based on static map features. These example cost values may be provided, for example, by the mapping/localization module 204 described herein in connection with FIG. 2. These cost values may be generated or provided as the autonomous vehicle travels along the roadway represented by the roadway map 500A. As shown, the roadway map 500A begins at five lanes, and narrows to a single lane. Because the left-most lane 505 is the furthest from what will be the only remaining lane, left-most lane 505 can have the highest density of cost values. As shown here, the cost values in the left-most lane 505 start at 25 and increase to 125. Additionally, each lane including the lane tapers 515, 520, and 525 include increasing cost values near to the respective lane taper 515, 520, and 525. As shown, the right-most lane also includes cost values that are proximate to the on-ramp 510, to compensate for potentially merging traffic.

Referring to FIG. 5B, illustrated is a diagram of cost values generated by a component of the autonomous vehicle that calculates highway courtesy cost values relating to other vehicles or obstacles that may affect merging or remaining in lanes of the roadway. As shown, the cost values generated by this component are not necessarily based on static map features, such as the lane tapers 515, 520, and 525. As shown, the right-most lane of the roadway map 500B includes an example cost value of 75 proximate to the on-ramp 510, due to the oncoming vehicles 530 detected in the on-ramp 510. Further along the roadway map 500B, an additional example cost value of 75 has been generated in the right-most lane, due to a detected obstacle 535 on the shoulder of the roadway.

Referring to FIG. 5C, illustrated is a diagram of cost values generated by a component of the autonomous vehicle that detects traffic behavior on the roadway and generates cost values relating to the behavior (e.g., speed, location, direction, expected increase in speed, location, or direction, etc.) of vehicles on the roadway. As shown in the roadway map 500C, an example cost value of 75 has been generated in the right-most lane due to the detected slow traffic 540. In this example, the detected traffic 540 is moving slowly in the right-most lane due to the five-lane roadway being reduced to a single lane. Although only a single cost value is shown here, it should be understood that cost values for slow traffic or other traffic features may be detected in different areas of the roadway.

FIG. 6 depicts a diagram of an example lane selection cost map 600 generated based on the cost values shown in FIGS. 5A, 5B, and 5C, according to an embodiment. The lane selection cost map 600 can be generated by an autonomous vehicle system (e.g., the system 150, the system 250, the road analysis module 300, etc.), as described herein. In this example, the lane selection cost map 600 includes the same road features (e.g., the left-most lane 605, the on-ramp 610, the lane taper regions 615, 620, and 625) as the roadway maps 500A, 500B, and 500C of FIGS. 5A, 5B, and 5C, respectively. However, the lane selection cost map 600 includes cost values for the roadway that have been combined from all of the roadway maps 500A, 500B, and 500C. In this non-limiting example, the autonomous vehicle system has handled regions of the map with overlapping cost values using a "MAX" operation, in which the maximum cost value for a region or stretch in which cost values overlap is selected as the cost value for the region. However, it should be understood that alternative combination functions may also be utilized, including sum operations or weight sum operations, as described herein.

Figure 7:
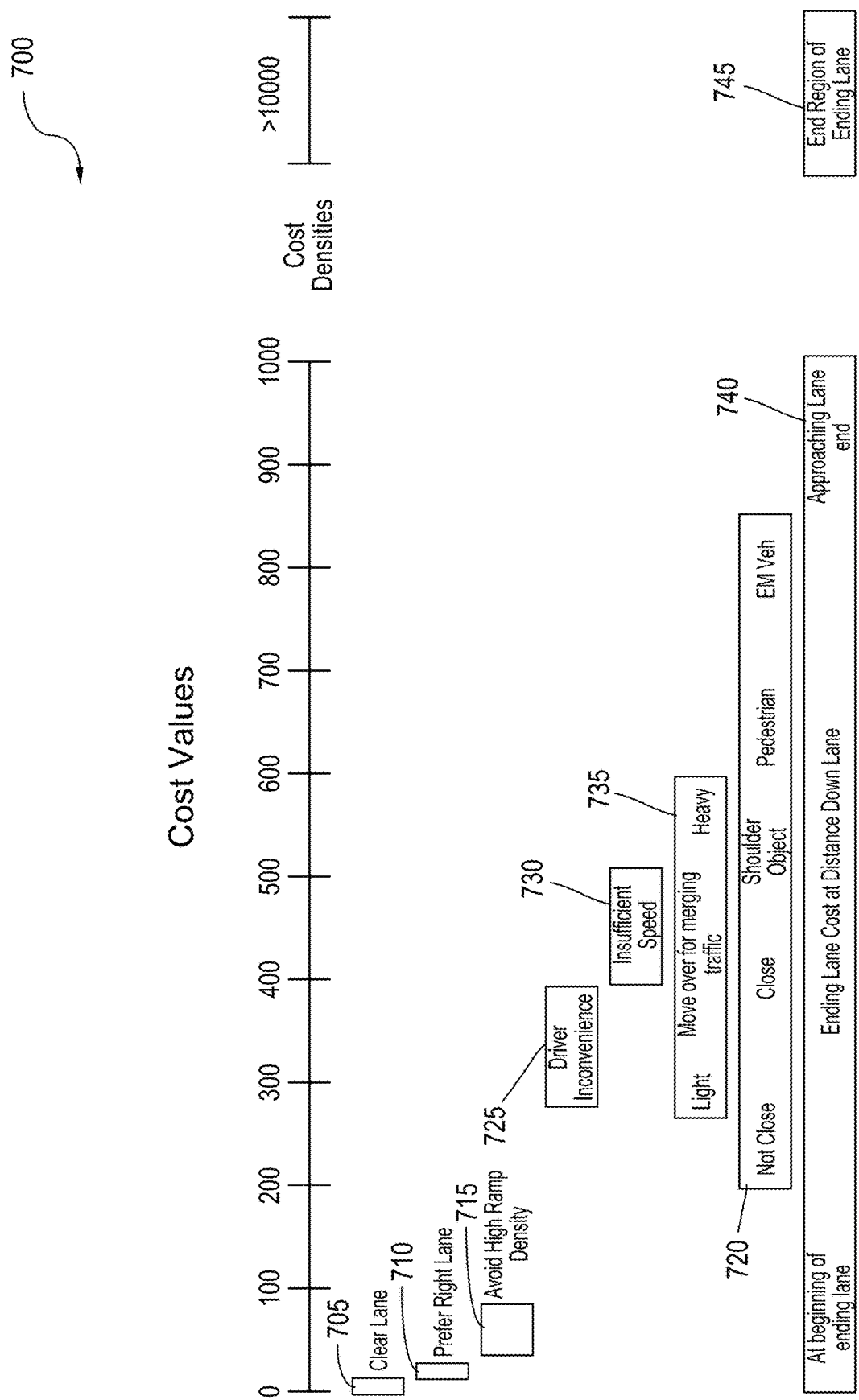
FIG. 7 depicts an example graph diagram showing different cost values for different behaviors or conditions generated or detected by the autonomous vehicle, according to an embodiment.

FIG. 7 depicts an example graph diagram 700 showing different cost values for different behaviors or conditions generated or detected by the autonomous vehicle, according to an embodiment. Although several behaviors or conditions are represented in the graph diagram 700, it should be understood that these are provided for non-limiting example purposes, and that additional or alternative conditions or behaviors may be considered when determining cost values, and that additional or alternative cost values may be assigned to each behavior or condition. In this example graph diagram, clear lanes 705 and right-most lanes 710 include relatively low cost values. Additionally, areas with high ramp density 715 can have cost value between about 40-90, in a non-limiting example.

The graph diagram 700 further includes ranges of cost values for types of behavior, for example, behaviors that result in inconvenience to other drivers on the roadway. Other driver inconvenience behaviors 725 may have cost values ranging from 280-400, in a non-limiting example. Behaviors that would result in the autonomous vehicle having insufficient speed 730 may have cost values ranging from about 400-500.

Certain behaviors may also be assigned a relative wider range of cost values. For example, a behavior 735 that indicates the autonomous vehicle should move over for merging traffic may have a cost value of around 250 for light traffic, to a cost value of around 600 for heavy traffic. A behavior 720 that governs the autonomous vehicle moving to avoid shoulder obstacles may range from around 200 for inconsequential obstacles that are not close to the shoulder to around 700 for pedestrians on the shoulder, to around 850 for other vehicles parked on the shoulder. In an example, cost values may be assigned to lanes that are ending 740 in a range from around 0 at the beginning of an ending lane to around 1000 when approaching the end of the lane. It should be understood that these ranges of cost values are provided purely for example purposes, and should not be considered limiting on the scope of the type or magnitude of cost values that may be assigned using the techniques described herein.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:
    at least one processor coupled to non-transitory memory, the at least one processor configured to:
        receive a plurality of cost values from a plurality of components of an autonomous vehicle, each cost value representing a cost for traveling in a particular region of a particular lane;
        determine an overall cost of a particular region based on a weighted sum of at least two cost values for the particular region;
        generate a lane selection cost map including the particular region determined overall cost and at least one other region including a determined overall cost;
        responsive to a trajectory of the autonomous vehicle in an adjacent lane having a lower cost value than a trajectory of the autonomous vehicle in a current lane, determine that the autonomous vehicle should change lanes based on the lane selection cost map; and
        transmit a command that causes the autonomous vehicle to change lanes responsive to determining that the autonomous vehicle should change lanes.

2. The system of claim 1, wherein the at least one processor is further configured to determine that the autonomous vehicle should change lanes based on execution of a pathfinding algorithm using the lane selection cost map.

3. The system of claim 1, wherein the at least one processor is further configured to generate the lane selection cost map in response to a detected object in an environment surrounding the autonomous vehicle.

4. The system of claim 1, wherein at least one of the plurality of cost values is determined based on a location of the autonomous vehicle.

5. The system of claim 1, wherein at least one of the plurality of cost values is determined based on map data comprising one or more static map features.

6. The system of claim 1, wherein at least one of the plurality of cost values is determined based on a detected obstacle.

7. A method, comprising:
- receiving, by one or more processors coupled to non-transitory memory, a plurality of cost values from a plurality of components of an autonomous vehicle, each cost value representing a cost for traveling in a particular region of a particular lane;
- determine an overall cost of a particular region based on a weighted sum of at least two cost values for the particular region;
- generating, by the one or more processors, a lane selection cost map including the particular region determined overall cost and at least one other region including a determined overall cost;
- responsive to a trajectory of the autonomous vehicle in an adjacent lane having a lower cost value than a trajectory of the autonomous vehicle in a current lane, determining, by the one or more processors, that the autonomous vehicle should change lanes based on the lane selection cost map; and
- transmitting, by the one or more processors, a command that causes the autonomous vehicle to change lanes responsive to determining that the autonomous vehicle should change lanes.

8. The method of claim 7, further comprising determining, by the one or more processors, that the autonomous vehicle should change lanes based on execution of a pathfinding algorithm using the lane selection cost map.

9. The method of claim 7, further comprising generating, by the one or more processors, the lane selection cost map in response to a detected object in an environment surrounding the autonomous vehicle.

10. The method of claim 7, wherein at least one of the plurality of cost values is determined based on a location of the autonomous vehicle.

11. The method of claim 7, wherein at least one of the plurality of cost values is determined based on map data comprising one or more static map features.

12. The method of claim 7, wherein at least one of the plurality of cost values is determined based on a detected obstacle.

13. An autonomous vehicle comprising one or more processors configured to:
- identify a plurality of cost values generated by a plurality of components of the autonomous vehicle, each cost value representing a cost for traveling in a particular region of a particular lane;
- determine an overall cost of a particular region based on a weighted sum of at least two cost values for the particular region;
- generate a lane selection cost map including the particular region determined overall cost and at least one other region including a determined overall cost;
- responsive to a trajectory of the autonomous vehicle in an adjacent lane having a lower cost value than a trajectory of the autonomous vehicle in a current lane, determine that the autonomous vehicle should change lanes based on the lane selection cost map; and
- cause the autonomous vehicle to change lanes responsive to determining that the autonomous vehicle should change lanes.

* * * * *